(12) United States Patent
Elzbieta

(10) Patent No.: US 7,440,959 B2
(45) Date of Patent: Oct. 21, 2008

(54) METHOD OF CONTROLLING EXCHANGES OF DATA BETWEEN TWO APPLICATIONS, NAMELY A CLIENT-TYPE APPLICATION AND A SERVER-TYPE APPLICATION RESPECTIVELY

(76) Inventor: Cochard Plociennik Elzbieta, 13 Rue du Petit Montesson, 78110 Le Vesinet (FR)

( * ) Notice: Subject to any disclaimer, the term of this patent is extended or adjusted under 35 U.S.C. 154(b) by 179 days.

(21) Appl. No.: 10/482,667

(22) PCT Filed: Jul. 1, 2002

(86) PCT No.: PCT/FR02/02275

§ 371 (c)(1),
(2), (4) Date: Jan. 5, 2004

(87) PCT Pub. No.: WO03/005670

PCT Pub. Date: Jan. 16, 2003

(65) Prior Publication Data

US 2004/0216128 A1 Oct. 28, 2004

(51) Int. Cl.
*G06F 7/00* (2006.01)

(52) U.S. Cl. .................... 707/101; 719/313; 709/220

(58) Field of Classification Search .................. 707/10; 709/200–250; 705/5

See application file for complete search history.

(56) References Cited

U.S. PATENT DOCUMENTS

| 4,605,414 | A | | 8/1986 | Czajka ........................ 623/13 |
| 5,506,961 | A | * | 4/1996 | Carlson et al. ................. 726/5 |
| 5,509,121 | A | * | 4/1996 | Nakata et al. ............... 709/230 |
| 6,170,008 | B1 | * | 1/2001 | Bahlmann et al. ........... 709/220 |
| 2003/0115244 | A1 | * | 6/2003 | Molloy et al. ............... 709/105 |
| 2003/0146977 | A1 | * | 8/2003 | Vale et al. ................. 348/207.1 |
| 2003/0149601 | A1 | * | 8/2003 | Cabral .......................... 705/5 |
| 2004/0003119 | A1 | * | 1/2004 | Munir et al. ................ 709/246 |

FOREIGN PATENT DOCUMENTS

| AU | 702628 | 10/1996 |
| WO | WO 98 04971 A | 2/1998 |

* cited by examiner

*Primary Examiner*—Sathyanarayan Pannala
(74) *Attorney, Agent, or Firm*—Browdy and Neimark, P.L.L.C.

(57) ABSTRACT

The invention relates to a method of controlling exchanges of files or other transferable objects between two applications, namely a client-type application and a server-type application respectively, using a TCP/IP FTP-type protocol or similar. One of said applications is an FTP-type application while the other is either an FTP-type application or a compatible application. The inventive method makes use of a Hyperserver application which is executed on a host platform and which performs the role of intermediary between the two applications in transfer protocol negotiations and in the transfer of files or other transferable objects.

2 Claims, 1 Drawing Sheet

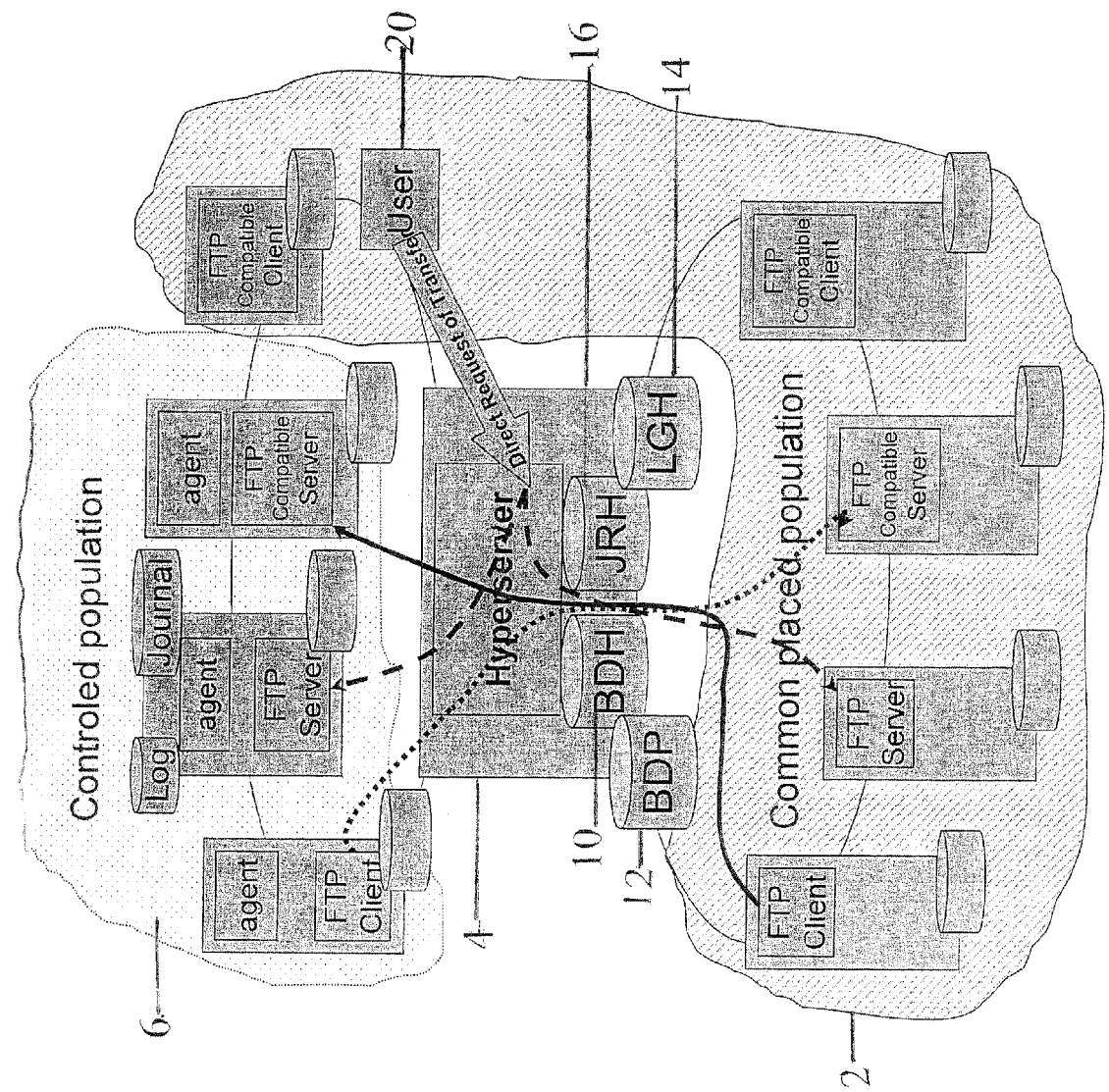

METHOD OF CONTROLLING EXCHANGES OF DATA BETWEEN TWO APPLICATIONS, NAMELY A CLIENT-TYPE APPLICATION AND A SERVER-TYPE APPLICATION RESPECTIVELY

This application is a 35 U.S.C. 371 National Stage entry of PCT/FR02/02275, filed Jul. 1, 2002, which claims priority from French Patent Application No. 01/08974, filed Jul. 3, 2001, the contents of which are herein incorporated by reference to the extent allowed by law.

BACKGROUND OF THE INVENTION

The patent concerns a method for the control of data exchange between two applications, client and server type respectively, according to FTP of TCP/IP (RFC 959 1579) or analogous protocol type, wherein:
- TCP/IP ("Transmission Control Protocol")/("Internet Protocol") is a set of transmission protocols used on Internet network,
- FTP ("File Transfer Protocol") is a TCP/IP file transfer protocol used on Internet and on enterprise TCP/IP networks, Intranet, as well,
- RFC ("Request For Comment") is a naming way of TCP/IP protocols,
- The server and client applications are specifically those of FTP protocol or they've ability to generate a data flow compatible with the protocol.

BRIEF SUMMARY OF THE INVENTION

The object of the patent is, especially but not exclusively, a method implementing a Hyperserver application which is executed on a host (computer) platform and works as intermediary between two applications where one of them is of FTP type whereas the other one is either of FTP type or a compatible one, to lead formal transfer negotiations and transfers themselves as well.

The Hyperserver application is provided with a means, which permit to have a visibility and an ability to interpret and translate all exchanged information whatever the execution environment of execution is. This position of the Hyperserver application enables it, not only to passively follow all exchanges but also to control them interfering in those exchanges depending on a control rules which will be imposed and defined in its data bases with applications-partners and transfer profiles directories.

To reinforce and extend its capacities of supervising and control beyond of its own execution platform, the method according to the invention may comprise an agent applications on a FTP (or compatible) application's execution platforms. Depending on the control rules and on agent applications deployment, all or only a part of FTP type (or compatible) applications population can be fully controlled. This population (or part of it) will be called here "controlled population". All FTP type (or compatible) applications, which do not get the advantage of the Hyperserver application control is named "common placed population" further in the presentation. Both populations may be part of the same IP network or may reside in two different networks and, in the second case, the Hyperserver application has to reside in the network of the controlled population and be accessible for applications of common placed population.

Being executed on an Intranet host and being the only and obligatory passing through point for Intra/Internet exchanges, the method according to the invention enables to carry out transfers ensuring the security and the confidentiality for the data sheltered in the Intranet network.

Moreover, it ensures functions of a powerful, centralized monitor of files or other transferable objects transfers. In this case the FTP type (or compatible) applications of Intranet network set up the controlled population and Internet partners play common placed population.

In this environment, the security and the confidentiality of the Intranet network as a whole may be preserved by the method according to the invention because the host names of the network, the files (or other transferable objects) directories and their physical names may remain invisible for the external partners of Intranet. Depending on the rules of physical file's (transferable object's) names and FTP or FTP compatible types server hosts' names attribution, external partners need only to know identifications of file transfers and connections profiles data bases entries, defined below and among this identificators, only those, which are accessible for the identified and authenticated requestor.

Hyperserver application is an intermediate application, which has full control and visibility of all formal negotiations and files (or other transferable objects) data exchanged by communicating applications. Thereby, and independently of its execution environment, Hyperserver application has all necessary information to ensure the monitor functions like supervision, statistics and interactions with operators or another application.

BRIEF DESCRIPTION OF THE DRAWING

The FIGURE is a schematic view of a system according to the invention.

DETAILED DESCRIPTION OF THE INVENTION

More accurately, and referring to the FIGURE, according to the invention the method may implement:
- a common placed population 2 of hosts residing in an IP network and having an access to a Hyperserver application 4 and sheltering:
  application of FTP type or able to generate data flow compatible with FTP protocol,
  files or other transferable objects identifiable and visible for this applications,
- Hyperserver application being executed on a host having an access to FTP type or compatible applications described above and disposing of:
  a database 10 with directory of controlled and common placed hosts indicating communicating applications with their IP addresses and their lists of users authorized to access to them and their authorization attributes if necessary (BDH),
  a database 12 with files or other transferable objects transfer profiles directory (BDP),
  Hyperserver application central "LOG" file 14 (LGH), containing transfer event log records,
  Hyperserver application central journal file 16 (JRH), containing transfers summary information records,
- Controlled population of hosts 6 residing in IP network and sheltering:
  Application of FTP type or able to generate data flow compatible with FTP protocol,
  Files or other transferable objects identifiable and visible for these applications,
  Hyperserver agent applications disposing eventually of their own "LOG" and journal files.

It is convenient to note that the controlled population of hosts 6 with those which shelter Hyperserver application may be a set of computers and files of an enterprise constituent a company's Intranet network. The BDP database 12 with file transfer profiles with FTP or compatibles applications constitute for Hyperserver application the file access system in the terms of FTP model. The common placed population 2 may be, in this case, a set of computers accessing via Internet to Hyperserver application to transfer files with enterprise hosts under Hyperserver control.

BDH database 10 contains all information needed by Hyperserver application to:
  Identify and/or authenticate a transfer requester 20,
  Identify and/or access to addressed application respecting authentication rules,
  Eventually determine the rules of encryption to be used depending on identified requester and addressed partner,
  Identify and locate the Hyperserver agent application assigned for the connection part in the controlled environment,
  Eventually identify methods to be executed at the beginning and/or at the end of the connection, etc. . . . .

The BDP database 12 defines files or other objects transfers profiles and scenarios using the following attributes, in particular:
  location of files or other objects to be sent or received, and/or
  their name or the method of naming, and/or
  their access method, and/or data type, and/or their code, and, eventually:
  methods and scenarios to be executed at the beginning and/or during and/or at the end of transfer and/or their place of execution, and/or
  criterions and attributes of access authorization to files of other transferable objects.

It is to be noted that except FTP type applications which are the partners of exchanges, the only application having access to the file (other object) transferred data is Hyperserver application. This capacity enables Hyperserver to eventually act on them executing during transfer methods.

Hyperserver agent application implementation on each host of controlled application enables the local file transfer supervision. The agent application supplied with a Hyperserver application communication interface may recover information concerning files transfers from theirs execution location and/or receive Hyperserver application command to submit methods at the beginning or at the end of transfer under its own control.

In the preferred patent version, databases BDH and BDP may constitute local directories LDAP ("Lightweight Directory Access Protocol") type of the controlled population network. LDAP is an open protocol and widely distributed which enables applications executing in heavily heterogeneous environment to access those directories without additional development.

For example, the following presentation describes the progress of files transfer operations in Intranet/Internet environment where Hyperserver application ensures the supervision and the monitoring of file transfers at Intranet side. Nothing prevents otherwise to imagine another Hyperserver application placed in Internet network generating FTP compatible flow and controlling file transfers of its hosts population.

In this environment, the progress of operations of file transfer request coming from the Internet is following:

FTP client type application requester of Internet side opens the connection with Hyperserver application owing to the set of open connection commands specifying its user name, its password and eventually its authentication data as with any classical FTP server, Depending of rules defined in the BDH directory, the information exchanged during this phase may be sufficient to determine the directory entry defining aimed Intranet side application's connection attributes (otherwise, additional command, for example FTP SITE command may be used to identify it), The correlation between the client requester and the aimed server enables Hyperserver application to look for all information concerning the requester access authorities, eventual encryption and its key and, as well, eventual negotiation protocol and modalities the aimed server connection in the BDH database, As soon as the protocol and modalities of the connection are known, Hyperserver application may open connection with the aimed application and to start to exchange commands eventually as planned by the protocol, The negotiation going on the contains of one of FTP commands like "store", "store unique", "retrieve" etc. . . . received by Hyperserver application has to enable it to identify a file transfer or other transferable objects profile which constitutes an entry of BDP directory, The definition of determined profile enables Hyperserver application to verify the transfer direction, to identify the file to be transferred, its attributes, methods to be executed at the beginning, during and at the end of transfer, as well as the designation of the application under control of which the execution have to be done, Only when the eventual transfer negotiations with aimed application leaded by the transfer profile are completed, Hyperserver application may acknowledge the transfer request received from client, Two, FTP meaning "DATA" connections will be opened: one, between the FTP client and Hyperserver application and the other one, between Hyperserver application and the aimed application; the data received by Hyperserver application on the one connection will be sent on the other one eventually undergoing the treatment of "during transfer" method, The execution of, eventual, at the beginning and at the end of transfer methods will be done under Hyperserver's agent application control of the host of the aimed application synchronously with the dialog between this application and Hyperserver application and by order of the last one, LOG records (file in which all connection's, negotiation's and transfer's events are recorded) and journal (statistics file) generated by Hyperserver application will be written in LGH and JRH files and their copies will be sent to the concerned Hyperserver agent application to be written in local "LOG" and journal files.

In the case where the transfer request comes from an Intranet Host, it means from the "controlled population", the progress of the transfer method may be done symmetrically. Meanwhile it's known that the FTP transfer negotiation between the client and the server applications does not let pass to the server the name of the file to be transferred used at the client side.

Therefore when the request comes from Intranet side FTP client application, this FTP protocol particularity reduce files exchange supervision possibilities which may be awaited from Hyperserver application because it has none information concerning the file (or the object to be transferred) of its own domain of control.

In this case, it is preferable to use a feature of the method according to the invention, named "Direct Request of Transfer".

In this functioning, when user sets a Direct Request of Transfer to the Hyperserver application, the progress of operations is as follows:

the request has to contain all information needed to determine the BDH directory entry and the one of BDP as well, Using information found in the determined BDH entry, Hyperserver application will initiate, as a client, two connections: one with the FTP server type (or compatible application) at Intranet side and other one with FTP server type at Internet side, Hyperserver application will negotiate two transfers according to information found in BDP entry(ies) and in the request itself, one of transfers will be a receiving and the other one transmission of files (or another transferable object), Hyperserver application will forward the file data from its origin to its destination through two DATA type of FTP meaning connections or compatibles between Hyperserver application itself and two server applications, Transfer profil(s) and other parameters of the Direct Request of Transfer enables Hyperserver application to determine files names at both sides and all transfer attributes and methods to be started at the beginning, during and at the end of transfer.

The invention claimed is:

1. Computer implemented method for the control of files or other transferable objects exchanges between FTP type or compatible applications, being a membership of a controlled population, and FTP type applications being a membership of common placed population and being executed on different platforms, said method implementing:

A common placed population of hosts residing in a IP network and having access to a Hyperserver application and sheltering:

FTP type applications or applications able to generate a data flow compatible with FTP protocol, Files or other transferable objects identifiable and visible to those applications, A Hyperserver application being executed on a host having access to FTP type or compatible said applications and including:

A controlled and common placed hosts directory database designating communicating applications with their IP addresses and lists of users authorized to access them as well as authorization attributes if necessary, files or other transferable objects transfer profiles directory database, Hyperserver application central LOG file containing transfer's events log records, Hyperserver application central journal file containing transfers summary records, A controlled population of hosts residing in a IP network and sheltering:

Applications of FTP type or being able to generate a data flow compatible with FTP protocol, Files or other transferable objects identifiable and visible for those applications, Hyperserver agent applications eventually supplied with their own LOG and journal files, wherein, in the case of a transfer request coming from Internet network, it comprises the following operations sequence:

Opening of the connection with the Hyperserver application by the Internet network requesting client owing to a set of connection opening commands comprising a user name, a password and, eventually authentication data, Determination by the Hyperserver application of the directory database entry defining Intranet network aimed application connection attributes in the case where said pieces of information are sufficient keeping into accounts rules defined in the controlled and common placed hosts directory, otherwise using of a supplementary FTP commands to enable to do it, Research done by the Hyperserver application in the controlled and common placed hosts directory database of all pieces of information concerning the requestor access authorities, the transfer protocol, connection's with aimed server modalities, the identification of the process to be executed at the beginning of the connection, as well as eventual start of said process or some number of processes, Opening of the connection with the aimed application by the Hyperserver application and the exchange of eventually planned commands as soon as it and connection modalities are known, Carrying out of the negotiation between the client requester and the Hyperserver application up to one of command types store, store unique, retrieve reception, Identification of a file or other transferable object transfer profile by the Hyperserver application which constitute an entry of the files or other transferable objects transfer profiles directory database following a transfer command reception by the Hyperserver application, Verification by the Hyperserver application of transfer direction, of the identification of the file to be transferred, its attributes, eventual processes to be executed at the beginning, during and at the end of the transfer as well as the designation of applications under control of which they have to be executed owing to the definition of the determined profile, Acknowledgement, by the Hyperserver application, of the transfer request received from the client at the end of eventual negotiations of transfer leaded by the transfer profile with aimed application, Opening of two, FTP meaning, DATA connections to be seen: one connection between the FTP client and Hyperserver application, and the other one between the Hyperserver application and aimed application, the data received by the Hyperserver application on one connection being afterwards sent to the other one application undergoing, eventually, said during transfer treatment, Execution of eventual processes at the beginning or at the end of transfer under the control of the Hyperserver agent application of the aimed application host, synchronized with the dialog between this application and the Hyperserver application, Closing of connections in progress with releasing of eventual end of connection processes, Recording of the events arrived during the sequence in corresponding files LOG file as well as statistic information in the journal Hyperserver application file and the transmission of records copies to the concerned Hyperserver agent application to be recorded in appropriated local files.

2. Computer implemented for the control of files or other transferable objects exchanges between FTP type or compatible applications, being a membership of a controlled population, and FTP type applications being a membership of common placed population and being executed on different platforms, said method implementing:

A common placed population of hosts residing in a IP network and having access to an Hyperserver application and sheltering:

FTP type applications or applications able to generate a data flow compatible with FTP protocol, Files or other transferable objects identifiable and visible to those applications, An Hyperserver application being executed on an host having access to FTP type or compatible said applications and including:

A controlled and common placed hosts directory database designating communicating applications with their IP addresses and lists of users authorized to access them as well as authorization attributes if necessary, files or other transferable objects transfer profiles directory database, Hyperserver application central LOG file containing transfer's events log records, Hyperserver application central journal file containing transfers summary records, A controlled population of hosts residing in a IP network and sheltering:

Applications of FTP type or being able to generate a data flow compatible with FTP protocol, Files or other transferable objects identifiable and visible for those applications, Hyperserver agent applications eventually supplied with their own LOG and journal files, wherein, in the case of a transfer request coming from Intranet network host, the request contains all the information needed to determine the controlled and common placed hosts directory database as well as the files or other transferable objects transfer profiles directory database entries and that it comprises the following operations sequence:

Initialization by the Hyperserver application as a client of two connections, to be seen: a first connection with the server FTP type or compatible application on the Intranet network and a second connection with a FTP type server on the Internet network, this initialization using the information found in the determined controlled and common placed hosts directory database entry respecting identification, authorization rules applying necessary encryption functions and executing eventual at the start of connection processes, Negotiation of two FTP transfers according to pieces of information found in the files or other transferable objects transfer profiles directory database and in the request itself, one of transfers being a receipt and the other one transmission of the file or another transferable object, Releasing of eventual at the beginning of transfer processes, the determination by the Hyperserver application of two sides file names and all transfer attributes as well processes to be released at the beginning, during and at the end of transfer owing to transfer profile and other request parameters, Forwarding by the Hyperserver application of file data from its origin to its destination trough two DATA connections, if necessary, in FTP meaning or compatibles, between Hyperserver application and two server applications, applying processes said during transfer, Execution of eventual processes at the end of transfer under the control of the agent of Hyperserver application of the aimed application host, synchronized with the dialog of this application and the Hyperserver application, Closing of connections in progress with releasing of eventual end of connection processes, Recording of the events arrived during the sequence in corresponding files LOG files as well as statistic information in the journal Hyperserver application file and the transmission of records copies to the concerned Hyperserver agent application to be recorded in appropriated local files.

* * * * *